United States Patent [19]

Ishibashi

[11] Patent Number: 4,783,992
[45] Date of Patent: Nov. 15, 1988

[54] METHOD OF DETECTING CONFIGURATION OF TIRE

[75] Inventor: Akira Ishibashi, Kodaira, Japan

[73] Assignee: Bridgestone Corporation, Tokyo, Japan

[21] Appl. No.: 66,440

[22] Filed: Jun. 26, 1987

[51] Int. Cl.$^4$ ............................................. G01M 17/02
[52] U.S. Cl. ...................................................... 73/146
[58] Field of Search ............ 73/146; 33/203.11, 203.12

[56] References Cited

U.S. PATENT DOCUMENTS

| | | | |
|---|---|---|---|
| 4,258,567 | 3/1981 | Fisher, III | 73/146 |
| 4,311,044 | 1/1982 | Marshall et al. | 73/146 |
| 4,327,580 | 5/1982 | Suzuki et al. | 73/146 |
| 4,434,652 | 3/1984 | Christie | 73/146 |
| 4,440,018 | 4/1984 | Christie | 73/146 |
| 4,475,384 | 10/1984 | Christie | 73/146 |

*Primary Examiner*—Donald O. Woodiel
*Attorney, Agent, or Firm*—Sughrue, Mion, Zinn, Macpeak, and Seas

[57] ABSTRACT

In a method of detecting an outer configuration of a side wall surface of an inflated tire, a distance between a sensor and the side wall surface is detected in a non-contact manner to derive a displacement signal, the displacement signal is converted into a digital displacement signal and successive peaks of the digital displacement signal are detected. Heights $h_n$ and distances $l_n$ between successive peak points are derived and areas $AS_n$ and $BS_n$ surrounded by the displacement signal and a rectangle whose corners are coincident with adjacent peak points are derived. The heights $h_n$, distances $l_n$ are areas $AS_n$, $BS_n$ are compared with threshold values $h_R$, $l_R$ and $AS_R$, $BS_R$, respectively. When $h_n > h_R$, $l_n < l_R$ and $AS_n > AS_R$ or $BS_n > BS_R$, a relevant tire is judged to be inferior.

7 Claims, 3 Drawing Sheets

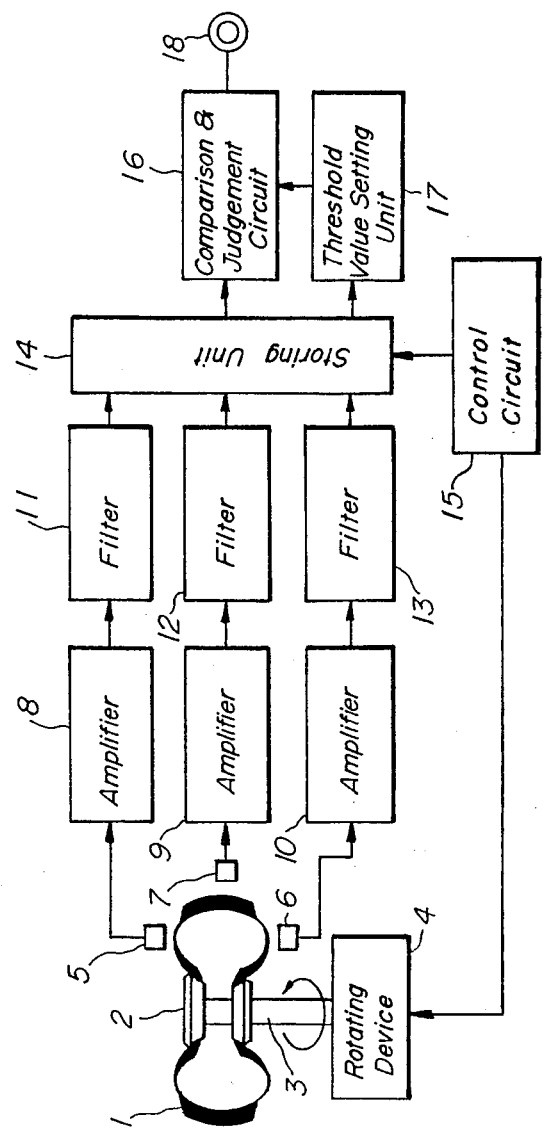

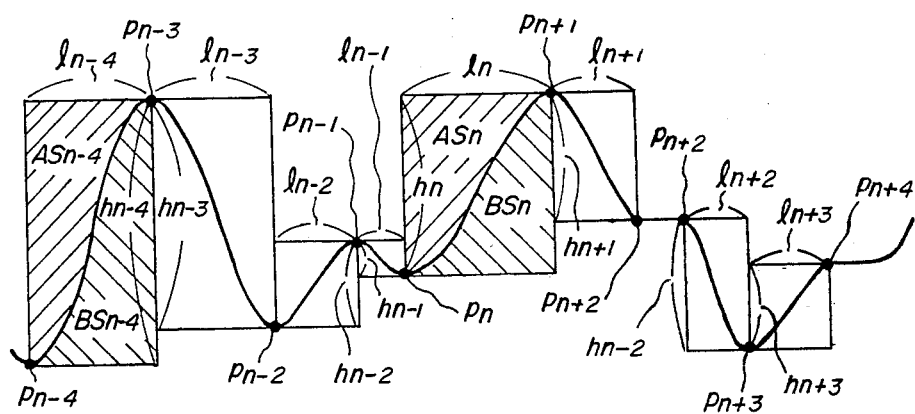

FIG_3
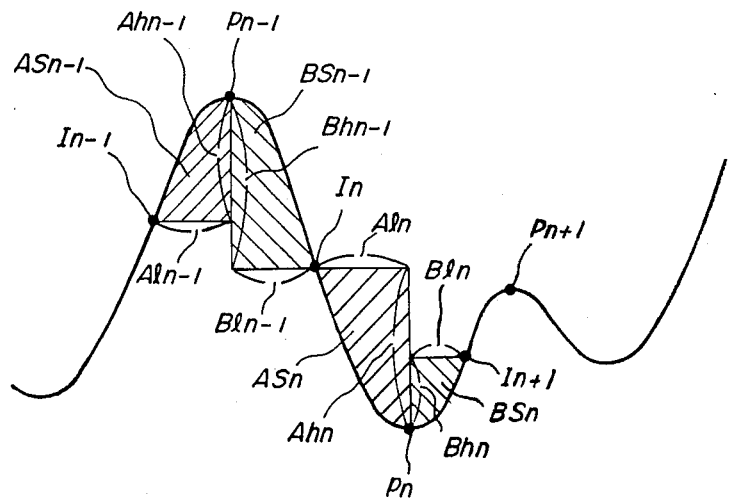

METHOD OF DETECTING CONFIGURATION OF TIRE

BACKGROUND OF THE INVENTION

Field of the Invention and Related Art Statement

The present invention relates to a method of detecting a configuration of a tire, and more particularly a method of detecting depressions and protrusions on a side wall surface of a tire.

In radial tires, a steel cord having a number of thin steel wires aligned therein is employed. However, it would be not always guaranteed that the steel wires are aligned at a regular pitch. That is to say, spaces between adjacent steel wires might become wider or narrower than a predetermined space. If the space is wider than the standard value, a corresponding portion of a tire side wall surface would protrude when the tire is inflated. On the contrary, if the spaces are smaller than the standard length, the corresponding portion of tire surface is depressed upon inflating the tire. If the tire has such protrusions and depressions, a desired property of tire might be deteriorated. Therefore, it is necessary to check whether or not a manufactured tire has such protrusions and depressions particularly on its side wall portion, while the tire is normally inflated.

Heretofore, the above mentioned checking operation is generally carried out by an operator. That is to say, the operator passes his hand over the side wall surface of inflated tire to find any depressions and protrusions. However, such a checking operation requires a skill and causes human errors.

In order to mitigate such a drawback, in Japanese Patent Application Laid-open Publication (Kokai) No. 56-122,931, there has been propose a method of automatically detecting the protrusions and depressions on the side wall surface of tire. In this known method, use is made of a displacement sensor of an electrostatic capacitance type to measure a distance between the sensor and the side wall surface in a non-contact manner, while the tire is rotated at a constant speed. Then, a displacement signal is processed to detect a configuration of depression and protrusion on the side wall surface, and the detected configuration is compared with a standard configuration to judge the depressions and protrusions.

In the known method of detecting the outer configuration of tire, in order to detect the protrusions and depressions from the analog displacement signal supplied from the displacement sensor, the analog displacement signal is differentiated to detect raising edges and trailing edges of the displacement signal, and these raising and trailing edges are unconditionally determined to be the protrusion and depression, respectively. In such a method, if the displacement signal has a simple waveform, the depressions and protrusions could be detected accurately. However, in general, since the side wall surface has various characters and marks, decorative lines, etc. formed therein, the displacement signal has a rather complicated waveform. Then it is quite difficult to detect the protrusions and depressions on the tire surface in an accurate manner. For instance, in case of detecting a protrusion, only a raising edge of the displacement signal is taken into account, but a next trailing edge is not considered at all, and in case of detecting a depression only a trailing edge is considered, but a next raising edge is not taken into account. Therefore, if a small protrusion is existent in a large depression and if a small depression is included in a large protrusion, these small protrusion and depression could not be detected precisely. In this manner, the known method has a low detecting precision and a reliable detection could not be expected.

Moreover, in the known method since the protrusions and depressions are judged only by width and amplitude of the displacement signal, judged result obtained by rotating the tire in one direction might differ from that obtained by rotating the tire in the opposite direction. Further, since measurement data is processed in an analog manner, the measured data could not be obtained as numeric values. Therefore, only a final judgment is displayed, and it is impossible to analyze intermediate steps for deriving such judgment.

SUMMARY OF THE INVENTION

The present invention has for its object to provide a novel and useful method of detecting the depressions and protrusions on the side wall surface of tire in an accurate and precise manner, while a lot of useful data for the configuration of tire can be obtained.

According to the invention, a method of detecting an outer configuration of a surface of an inflated tire comprises the steps of:

rotating the inflated tire through a sensor which can measure a distance between the sensor and the surface of tire in a non-contact manner to derive an analog displacement signal;

converting the analog displacement signal into a digital displacement signal;

storing the digital displacement signal in relation to a rotational position of the tire;

deriving peak points of the digital displacement signal; and detecting an outer configuration of a surface of tire in accordance with the detected peak points.

In the tire configuration detecting method according to the invention, since the depressions and protrusions are detected on the basis of the peak points of the digital displacement signal, it is possible to detect a small protrusion in a large depression and a small depression in a large protrusion precisely.

DESCRIPTION OF THE DRAWINGS

FIG. 1 is a block diagram showing an embodiment of an apparatus for carrying out the tire configuration detecting method according to the invention; and FIGS. 2 and 3 are signal waveforms for explaining a manner of detecting the depressions and protrusions.

DESCRIPTION OF THE PREFERRED EMBODIMENTS

FIG. 1 is a block diagram illustrating an embodiment of the apparatus for carrying out the tire configuration detecting method according to the invention. A tire whose outer configuration is to be detected is secured to a rim 2 and is inflated to a given pressure. The rim 2 is coupled via a shaft 3 with a rotating device 4. Opposite to upper and lower side wall portions of the tire 1 are arranged non-contact type displacement sensors 5 and 6 to measure distances between the sensors and the side wall surfaces, respectively. In the present embodiment, there is further arranged a non-contact type displacement sensor 7 opposite to a tread portion of the tire 1 to measure a distance therebetween. These non-contact type sensors 5, 6 and 7 may be formed by an electrostatic capacitance type sensor or an optical type sensor. Displacement signals produced by the sensors 5, 6 and 7 are amplified by amplifiers 8, 9 and 10 and then are passed through filters 11, 12 and 13 to remove noise. The displacement signals thus processed are stored in a storing unit 14 comprising A/D converters and memories. In the storing unit 14, the analog displacement signals supplied from the sensors 5, 6 and 7 are converted into digital displacement signals by sampling the analog displacement signals with sampling pulses synchronized with the revolution of the tire 1, and the digital displacement signals are stored at given positions in the memories. In order to form the sampling signals synchronized with the revolution of the tire 1, the rotating device 4 is connected to a control circuit 15 which effects the positioning of the displacement sensors 5, 6 and 7. The control circuit 15 is also connected to the storing unit 14 so that the control circuit 15 supplies a driving signal to the tire rotating device 4 and the sampling pulses synchronized with the driving signal to the storing unit 14. In the present embodiment, the control circuit 15 is so constructed that 1000 samples are obtained per one revolution of the tire 1.

Then the digital displacement signals stored in the storing unit 14 are supplied to a comparison and judgement circuit 16 to detect depressions and protrusions on the side wall portion and the tread portion in a manner which will be explained later. The detected configurations of the tire are then compared with standard or threshold values supplied from a threshold value setting unit 17. Finally, the comparison and judgement circuit 16 supplies a judged result at an output 18.

FIG. 2 shows a signal waveform for explaining the process of extracting depressions and protrusions on the tire surface. In the present embodiment, the depressions and protrusions are detected on the basis of peak points of the displacement signal. According to the invention points of inflection of the displacement signal may be used in addition to the peak points. At first peak points $P_1, P_2 \ldots P_{n-1}, P_n, P_{n+1} \ldots$ of the displacement signal are derived. Then, distances $l_1, l_2 \ldots l_{n-1}, l_n, l_{n+1} \ldots$ between successive peak points and differences in levels, i.e. heights $h_1, h_2 \ldots h_{n-1}, h_n, h_{n+1} \ldots$ between adjacent peak points are derived. Next, a rectangle whose opposite corners are coincident with adjacent peak points is considered, and areas within the rectangle and divided by the displacement signal are calculated. An area above the displacement signal is represented by $AS_n$ and an area below the displacement signal is expressed by $BS_n$. These areas $AS_n$ and $BS_n$ may be derived by integrating areas surrounded by the rectangle and the displacement signal. In this manner, for successive peak points, there are derived width $l_n$, height $h_n$, areas $AS_n$ and $BS_n$. On the basis of these data it is possible to detect the depressions and protrusions in an accurate and precise manner.

In the present embodiment, in the circuit 16, the derived data $l_n, h_n, AS_n$ and $BS_n$ are compared with respective threshold values defining allowable ranges of variations of the data. Height $h_n$ is compared with a threshold height $h_R$, length $l_n$ is compared with a threshold length $l_R$, and areas $AS_n$ and $BS_n$ are compared with threshold areas $AS_R$ and $BS_R$, respectively. When $h_n > h_R$, $l_n < l_R$ and $AS_n > AS_R$ or $BS_n > BS_R$, the relevant tire is judged to be inferior. These threshold values can be determined experimentally. In general, the threshold values must be changed in accordance with kinds of tires, so that the setting unit 17 stores threshold values for various tires and can selectively supply to the circuit 16 a set of threshold values corresponding to a tire under check.

The displacement signal supplied from the sensor 7 for detecting the distance between the sensor and the tread surface of tire is processed in the same manner as that explained above and the height, length and areas are compared with threshold values.

FIG. 3 is a waveform of the displacement signal for explaining another embodiment of the process for detecting the outer configuration of tire. In this embodiment, in addition to the peak points $P_n$, points of inflection $I_n$ are used to detect the tire configuration. Distances $Al_n, Bl_n$ and heights $Ah_n, Bh_n$ between adjacent inflection points $I_n, I_{n+1}$ and a peak point $P_n$ situating therebetween and areas $AS_n$ and $BS_n$ are calculated. Then these values are compared with threshold values to determine whether the relevant tire is good or not.

As explained above, in the detecting method according to the invention since the protrusions and depressions are detected from the conditions of successive peak points, it is possible to detect accurately the protrusions and depressions from the displacement signal having a very complicated waveform. Further, when the points of inflection are detected and are processed in a similar manner to that for the peak points, the detecting precision can be further improved. Moreover, since the displacement signal is stored as digital data, there is a possibility that a lot of useful information is derived therefrom.

What is claimed is:

1. A method of detecting an outer configuration of a surface of an inflated tire comprising the steps of:
    rotating the inflated tire through a sensor which can measure a distance between the sensor and the surface of tire in a non-contact manner to derive an analog displacement signal;
    converting the analog displacement signal into a digital displacement signal;
    storing the digital displacement signal in relation to a rotational position of the tire;
    deriving peak points of the digital displacement signal;
    detecting an outer configuration of a surface of tire in accordance with the detected peak points by deriving heights $h_n$ between successive peak points;
    deriving distance $l_n$ between successive peak points;
    deriving first and second areas $AS_n$ and $BS_n$ surrounded by the displacement signal and a rectangle whose opposite corners are coincided with successive peak points; and
    comparing said heights $h_n$, distances $l_n$ and areas $AS_n$ and $BS_n$ with threshold values $h_R$, $l_R$ and $AS_R$ and $BS_R$, respectively.

2. A method according to claim 1, wherein said sensor is arranged opposite to a side wall of said tire to measure a distance between the sensor and a surface of the side wall of said tire.

3. A method according to claim 1, wherein when $H_n > h_R$, $l_n < l_R$ and $AS_n > AS_R$ or $BS_n > BS_R$, a relevant tire is judged to be inferior.

4. A method according to claim 3, wherein said threshold values $h_R$, $l_R$, $AS_R$ and $BS_R$ are changed in accordance with a king of a tire.

5. A method of detecting an outer configuration of a surface of an inflated tire comprising the steps of:
    rotating the inflated tire through a sensor which can measure a distance between the sensor and the surface of tire in a non-contact manner to derive an analog displacement signal;

converting the analog displacement signal into a digital displacement signal;

storing the digital displacement signal in relation to a rotational position of the tire;

deriving peak points of the digital displacement signal;

detecting an outer configuration of a surface of tire in accordance with the detected peak points; and deriving points of inflection $I_n$ of the displacement signal, whereby the outer configuration of tire is detected in accordance with the peak points and points of inflection.

6. A method according to claim 5, wherein said sensor is arranged opposite to a sidewall of said tire to measure a distance between the sensor and a surface of the sidewall of said tire.

7. A method of detecting an outer configuration of a surface of an inflated tire comprising the steps of:

rotating the inflated tire through a sensor which can measure a distance between the sensor and the surface of tire in a non-contact manner to derive an analog displacement signal;

said sensor is arranged in opposition to a tread surface of tire to measure a distance between the sensor and the tread surface of tire;

converting the analog displacement signal into a digital displacement signal;

storing the digital displacement signal in relation to a rotational position of the tire;

deriving peak points of the digital displacement signal; and detecting an outer configuration of a surface of tire in accordance with the detected peak points.

* * * * *